(12) United States Patent
Longchamp et al.

(10) Patent No.: US 7,518,113 B2
(45) Date of Patent: Apr. 14, 2009

(54) PRESSURE SENSOR

(75) Inventors: Jean-Francois Longchamp, Lausanne (CH); Dominique Marchal, Vallorbe (CH)

(73) Assignee: Robert Bosch GmbH, Stuttgart (DE)

( * ) Notice: Subject to any disclaimer, the term of this patent is extended or adjusted under 35 U.S.C. 154(b) by 281 days.

(21) Appl. No.: 10/583,474

(22) PCT Filed: Oct. 23, 2004

(86) PCT No.: PCT/DE2004/002372

§ 371 (c)(1),
(2), (4) Date: Jun. 19, 2006

(87) PCT Pub. No.: WO2005/062013

PCT Pub. Date: Jul. 7, 2005

(65) Prior Publication Data

US 2007/0068261 A1    Mar. 29, 2007

(30) Foreign Application Priority Data

Dec. 20, 2003  (DE)  ............... 103 60 079

(51) Int. Cl.
*G01J 5/02*  (2006.01)
(52) U.S. Cl. .................................. 250/343
(58) Field of Classification Search ........... 250/343
See application file for complete search history.

(56) References Cited

U.S. PATENT DOCUMENTS

| 4,378,701 | A |   | 4/1983 | Mountain et al. |
| 4,393,687 | A |   | 7/1983 | Muller et al. |
| 4,446,723 | A |   | 5/1984 | Boening et al. |
| 4,473,747 | A |   | 9/1984 | Brogardh et al. |
| 5,339,070 | A | * | 8/1994 | Yalowitz et al. ............. 340/578 |
| 6,619,130 | B1 | * | 9/2003 | Yutani et al. .................. 73/716 |

FOREIGN PATENT DOCUMENTS

| EP | 0 409 166 | 1/1991 |
| JP | 55500442 | 7/1980 |
| JP | 56106123 | 8/1980 |
| JP | 57110930 | 7/1982 |

* cited by examiner

*Primary Examiner*—Christine Sung
(74) *Attorney, Agent, or Firm*—Kenyon & Kenyon LLP

(57) ABSTRACT

A pressure sensor having a diaphragm which is differently deformable or locally changeable by pressure differences is described. A construction advantageously usable even in poorly accessible spaces having high temperatures is obtained in that at least one functional section of the diaphragm has a material which has the properties of a black-body radiator or has an emissivity used for detection in the spectral radiation range corresponding to the temperature of the diaphragm under its conditions of use, and a radiation receiver unit, which detects at least a portion of the emitted radiation, having at least one infrared radiation sensor, is assigned to the diaphragm.

13 Claims, 2 Drawing Sheets

PRESSURE SENSOR

FIELD OF THE INVENTION

The present invention relates to a pressure sensor having a diaphragm which is differently deformable or locally changeable through pressure differences.

BACKGROUND INFORMATION

A conventional pressure sensor of this type is based on the deflection of a deformable diaphragm being detected for the pressure measurement. A problem is, for example, provide to perform a pressure measurement in the combustion chamber of an internal combustion engine, in which temperatures of more than 500°C. exist.

SUMMARY

An object of the present invention is to provide a pressure sensor of the above-cited type, by which pressures can be measured reliably even in the event of unfavorable measurement conditions, for example, even in poorly accessible spaces having high temperatures.

According to an example embodiment of the present invention, for this purpose, at least one functional section of the diaphragm has a material which has the properties of a black-body radiator or has an emissivity used for detection in the spectral radiation range which corresponds to the temperature of the diaphragm under its conditions of use, and a radiation receiving unit which detects at least a portion of the emitted radiation, having at least one infrared radiation sensor, is assigned to the diaphragm.

Using this construction, the pressure is recorded and analyzed on the basis of a temperature detection of the diaphragm. The measurement is based on Planck's radiation law, according to which the radiant power per surface unit of a black-body radiator and per wavelength unit is determined by conventional formulas. In this case, the spectral emissivity of a surface is defined as the ratio between the spectral radiation density of this surface and the spectral radiation density of the black-body radiator at the same temperature. This function is less than or equal to 1 and, if it is constant, the surface is referred to as a gray radiator.

For illustration, FIG. 4 shows the spectral density of the radiant power for temperatures of 300° C., 400° C., 500° C., and 600° C. for a radiant surface of 1 mm diameter and an emissivity =1 (black-body radiator). The maximum of the spectral radiant power varies between 5 µm for a temperature of 300° C. and 3.3 µm for a temperature of 600° C. The curves display a much steeper shape on the left to the maximum, i.e., toward shorter wavelengths, than to the right, i.e., toward longer wavelengths. The radiation sensor and filters possibly positioned in front of it are selected in accordance with the existing temperature range.

Defined radiation and detection is favored if the functional section is positioned in a central area of the diaphragm and is implemented by coating the material, and the functional section is surrounded by a section which has a lower emissivity in at least the radiation range corresponding to the temperature of the diaphragm under the conditions of use.

Various example advantageous embodiments include the functional section being coated with carbon black, iron oxide, oxidized copper, or oxidized steel, and/or the surrounding section carrying a gold plating.

A stable, reliably functioning construction may be obtained by positioning an infrared conductor between the radiation receiver unit and the diaphragm, which is transparent in at least the spectral radiation range corresponding to the conditions of use of the pressure sensor. The high transparency in the relevant spectral radiation range may be selected in such a way that there is generally no attenuation of the radiation emitted by the diaphragm.

In this case, advantageous embodiment variations include the infrared conductor having a tubular section having a treated inner wall surface for guiding the infrared radiation emitted by the diaphragm and/or the infrared conductor having a dielectric waveguide for guiding the infrared radiation emitted by the diaphragm, it also being able to be advantageous that the infrared conductor, if it is implemented having a tubular section, carries a smooth surface having a roughness smaller than the relevant wavelengths and a coating reflecting at least the majority of the infrared radiation of the diaphragm, or that the infrared conductor, if it is implemented having a waveguide, is made of germanium, sapphire, quartz, calcium fluoride, or sodium chloride.

For this purpose, the infrared conductor may also have lens elements for radiation guiding.

The infrared radiation sensor having its radiation sensitivity tailored to the infrared radiation of the diaphragm and the radiation receiving unit being adapted to the oscillation frequency of the diaphragm contribute to the sensitivity and measurement precision. An analysis unit assigned to the radiation receiving unit may also be easily designed in a suitable manner for the measurement.

Various further possible embodiments result in the infrared radiation receiver having a pyroelectric detector, a bolometer, or a thermopile.

Furthermore, assigning a cooling device to the infrared radiation sensor and/or connecting an infrared filter upstream from the infrared radiation sensor for selecting a radiation band which is relevant to the measurement are advantageous for obtaining a reliable measured signal.

In order to exclude further negative environmental influences, a further advantageous measure is that the radiation receiver unit has two infrared radiation sensors, upstream from which infrared filters of different spectral transparencies are positioned, and that an analysis unit is implemented in such a way that the radiation components detected by the two infrared radiation sensors are separated into the component originating from deflections of the diaphragm and the component originating from temperature changes of the diaphragm.

BRIEF DESCRIPTION OF THE DRAWINGS

The present invention is described in greater detail below on the basis of exemplary embodiments with reference to the figures.

DETAILED DESCRIPTION OF EXAMPLE EMBODIMENTS

Figure 1:
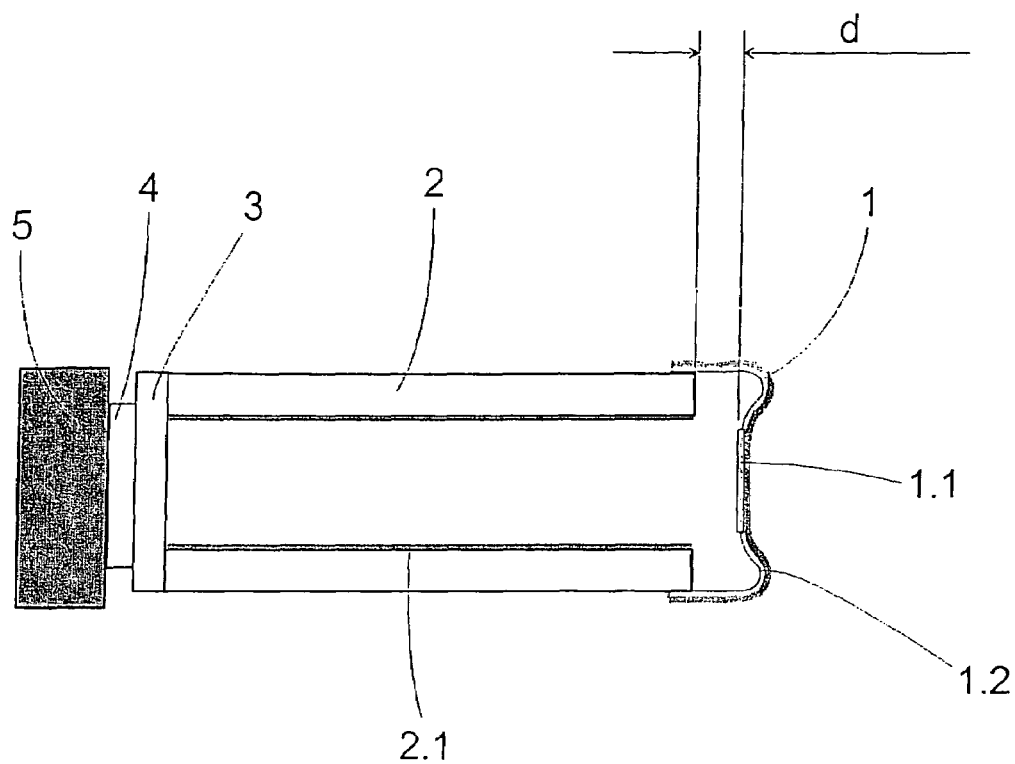
FIG. 1 shows an illustration of a pressure sensor in a longitudinal section.

A pressure sensor shown in FIG. 1 has a diaphragm 1, which is deflectable and/or deformable under the effect of a pressure, and an infrared radiation sensor 4, between which an infrared conductor 2 is positioned, which guides the infrared radiation emitted by diaphragm 1 to infrared radiation sensor 4. An optical filter 3 is advantageously positioned upstream from infrared radiation sensor 4, and a cooling element 5 is assigned to radiation receiver 4. The pressure is measured by measuring the deflection of diaphragm 1. The deflection is determined by measuring the change in the radiation flux detected by infrared radiation sensor 4, as shown by the diagram shown in FIGS. 2 and 3.

A central area of diaphragm 1 is implemented as a functional section 1.1 and coated with a material which has properties of a black-body radiator or good emissivity in a spectral radiation range corresponding to the temperature of diaphragm 1 when the pressure sensor is in the state of usage. A material of this type may be carbon black, iron oxide or a similar oxide, strongly oxidized copper, oxidized steel, or the like, for example. A surrounding area 1.2 of central or inner diaphragm section 1.1 is coated with a material which has only a weak emissivity in the spectral range in which the pressure sensor is used, so that the radiation source formed by diaphragm 1 is delimited as clearly as possible. Such a material may be a thin gold plating, for example. Infrared conductor 2 must have good transparency in the spectral range in which the pressure sensor is used. Infrared conductor 2 may be formed via a tubular section and/or a tubular body, whose inner wall surface has a suitable surface state having the lowest possible roughness (smaller than the wavelength) and which is coated with a material which has the best possible reflection in the spectral range corresponding to the use and therefore has the weakest possible emissivity, for which a gold or silver plating or the like is suitable. Infrared conductor 2 having a transparency of this type and inner wall surface 2.1 ensure almost complete transmission of the radiation emitted by the diaphragm to infrared radiation sensor 4.

Alternatively to the above-mentioned embodiment or in combination therewith, infrared conductor 2 may also be a dielectric waveguide comparable to a fiber-optic guide, which has good transmissivity in the spectral range corresponding to the use. Materials of this type may be, for example, germanium (for a spectral range from 1.8 µm to 28 µm), sapphire (0.17 µm to 6.5 µm), quartz (0.2 µm to 4.5 µm), calcium fluoride (0.2 µm to 8 µm), sodium chloride (0.2 µm to 26 µm), or the like. The waveguide may also be formed by one or more lenses, which may also be provided in combination with the above-mentioned embodiments.

Infrared radiation sensor 4 is to be as sensitive as possible in the spectral range of the infrared radiation of diaphragm 1 and have a response range which is tailored to the oscillation frequency of diaphragm 1. In addition, cooling element 5, such as a Peltier element, may be provided to cool infrared radiation sensor 4. Radiation sensor 4 may be a pyroelectric detector, a bolometer, a thermopile, or the like. Optical filter 3 is advantageously positioned upstream from infrared radiation sensor 4 in order to select a precisely tailored spectral radiation range for the analysis.

Figure 4:
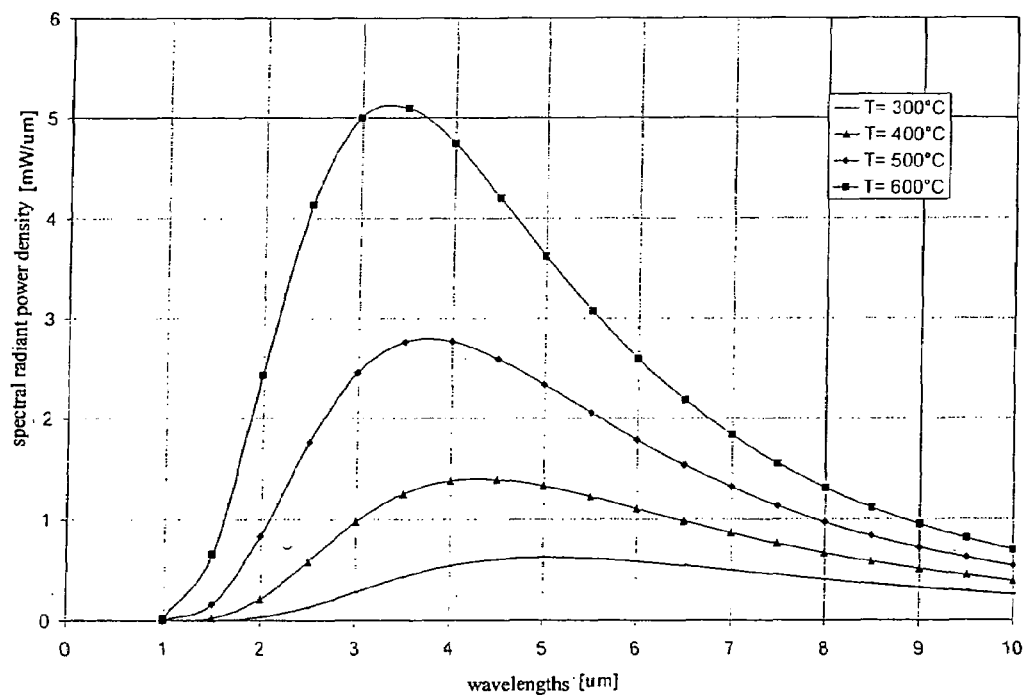
FIG. 4 shows the spectral radiant power of a radiating surface of 1 mm diameter for different temperatures.

In order to differentiate between possible variations of the radiation flux because of a deflection of diaphragm 1 from those which are to be attributed to a temperature change of diaphragm 1, at least two infrared radiation receivers 4 may be positioned one after another, for example, upstream from each of which an optical filter 3 is positioned, which transmit different spectral radiation ranges, one of the filters transmitting the radiation component corresponding to the left part of the curve shown in FIG. 4, for example, where it is steepest, while the other filter transmits the radiation component corresponding to the right part of the curve, where the slope is significantly flatter, so that a small temperature change of diaphragm 1 is expressed in different changes of the component of the radiation flux incident on the infrared radiation sensor, while a displacement of diaphragm 1 is expressed in an identical change in the radiation flux at both radiation sensors 4.

Figure 2:
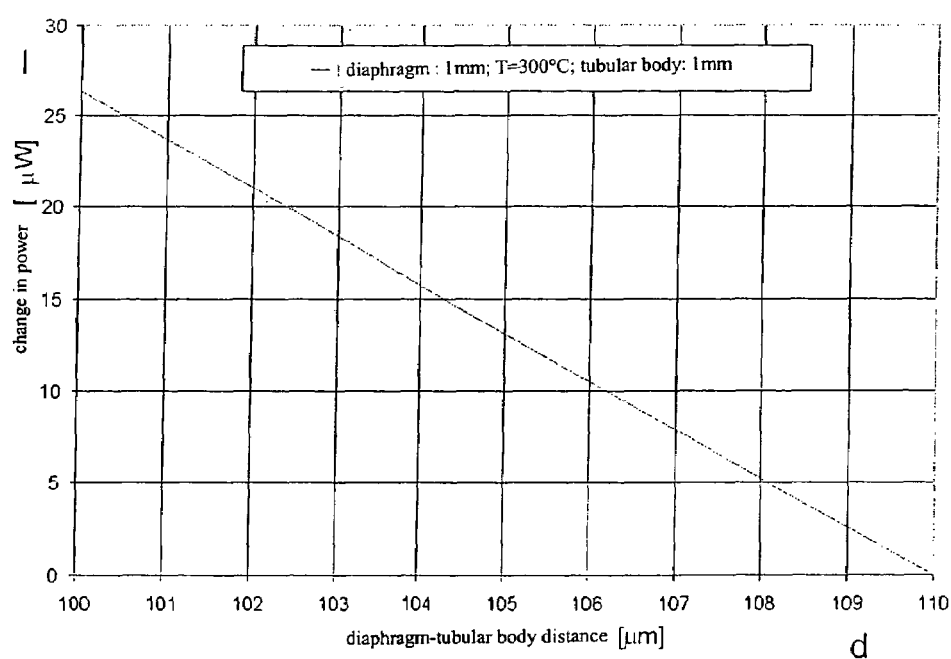
FIGS. 2 and 3 show a change in the radiation flux detected by a radiation sensor as a function of a deflection of the diaphragm of the pressure sensor using a tubular body and/or a fiber-optic guide.
Figure 3:
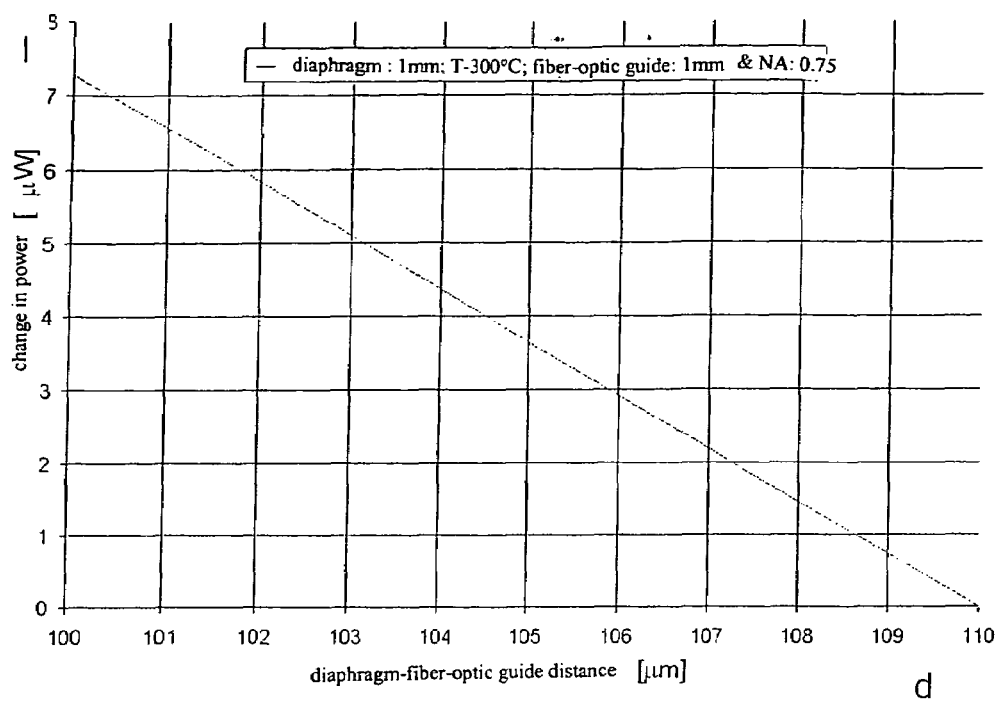

FIG. 2 shows the change in the radiation flux which is recorded by functioning infrared radiation sensor 4 in the event of a deflection of diaphragm 1 in the case in which functional section 1.1 of diaphragm 1 (black-body radiator) has a diameter of 1 mm at a temperature of 300° C. and infrared conductor 2 is a tubular body of 1 mm diameter, whose entry surface is positioned 110 µm distance from the surface of diaphragm 1 when the pressure sensor is in the rest state, it being assumed that the tubular guide body does not cause any radiation attenuation. FIG. 3 shows the change in the radiation flux under identical conditions, a fiber-optic guide of 1 mm diameter and a numerical aperture of 0.75 being used as infrared conductor 2, however. The figures show that received radiant power I significantly changes with distance d of the measurement diaphragm, i.e., is reduced with increasing distance.

What is claimed is:

1. A pressure sensor comprising:
   a diaphragm which is at least one of differently deformable and locally changeable by pressure differences, at least one functional section of the diaphragm having a material which has at least one of: i) properties of a black-body radiator, and ii) an emissivity essential for detection in a spectral radiation range corresponding to a temperature of the diaphragm under its conditions of use;
   a radiation receiver unit which detects at least a portion of radiation emitted by the at least one functional section of the diaphragm, the radiation receiver unit including at least one infrared radiation sensor; and
   an infrared conductor which is transparent at least in the spectral radiation range corresponding to the conditions of use of the diaphragm, the infrared conductor being positioned between the radiation receiver unit and the diaphragm.

2. The pressure sensor as recited in claim 1, wherein the functional section is positioned in a central area of the diaphragm and is implemented by a coating with the material, and the functional section is surrounded by a section which has a lower emissivity at least in the radiation range corresponding to the temperature of the diaphragm under the conditions of use.

3. The pressure sensor as recited in claim 1, wherein the functional section is coated with at least one of carbon black, iron oxide, oxidized copper, and oxidized steel.

4. The pressure sensor as recited in claim 1, wherein the section which is the lower emissivity has a gold plating.

5. The pressure sensor as recited in claim 1, wherein the infrared conductor at least one of: i) has a tubular section having a treated inner wall surface for guiding infrared radiation emitted by the diaphragm, and ii) has a dielectric waveguide for guiding the infrared radiation emitted by the diaphragm.

6. The pressure sensor as recited in claim 5, wherein the infrared conductor has the tubular section, and bears a smooth surface having a roughness smaller than relevant wavelengths and a coating reflecting at least most of the infrared radiation of the diaphragm.

7. The pressure sensor as recited in claim 5, wherein the infrared conductor has the dielectric waveguide and is made of at least one of germanium, sapphire, quartz, calcium fluoride, and sodium chloride.

8. The pressure sensor as recited in claim 1, wherein the infrared conductor has lens elements.

9. The pressure sensor as recited in claim 1, wherein the infrared radiation sensor has a radiation sensitivity tailored to an infrared radiation of the diaphragm, and the radiation receiver unit is adapted to an oscillation frequency of the diaphragm.

10. The pressure sensor as recited in claim 1, wherein the infrared radiation sensor has one of a pyroelectric detector, a bolometer, or a thermopile.

11. The pressure sensor as recited in claim 1, further comprising:
a cooling device assigned to the infrared radiation sensor.

12. The pressure sensor as recited in claim 1, wherein an infrared filter for selecting a radiation band relevant to a pressure measurement is connected upstream from the infrared radiation sensor.

13. A pressure sensor comprising:
a diaphragm which is at least one of differently deformable and locally changeable by pressure differences, at least one functional section of the diaphragm having a material which has at least one of: i) properties of a blackbody radiator, and ii) an emissivity essential for detection in a spectral radiation range corresponding to a temperature of the diaphragm under its conditions of use; and
a radiation receiver unit which detects at least a portion of radiation emitted by the at least one functional section of the diaphragm, the radiation receiver unit including at least one infrared radiation sensor;
wherein the radiation receiver unit has two infrared radiation sensors, upstream from which infrared filters of different spectral transparencies are positioned and wherein an analysis unit is implemented in such a way that radiation components detected by the two infrared radiation sensors are separated into the components originating from deflections of the diaphragm and the components originating from temperature changes of the diaphragm.

* * * * *